C. H. Berry,
Chamber Vessel.
No. 101,419. Patented Apr. 5, 1870.

Witnesses,

C. H. Berry, Inventor
per Ch. Sidney Whitman Attorney,

United States Patent Office.

CHARLES H. BERRY, OF EAST SOMERVILLE, MASSACHUSETTS.

Letters Patent No. 101,419, dated April 5, 1870.

IMPROVED CHAMBER-VESSEL.

The Schedule referred to in these Letters Patent and making part of the same

*To all whom it may concern:*

Be it known that CHARLES H. BERRY, of East Somerville, in the county of Middlesex and in the State of Massachusetts, has invented a new and improved Chamber-Vessel; and does hereby declare that the following description, taken in connection with the accompanying plate of drawings hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of household-utensils termed chamber-vessels; and Its nature consists in certain modifications in the details, and useful improvements in the construction thereof, by means of which the vessel is made air-tight, and its cover rendered easily detachable.

In the accompanying plate of drawings, which illustrate my invention and form a part of the specification thereof, in which corresponding parts are illustrated by similar letters—

Figure 1:
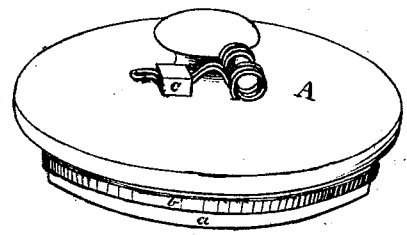
Figure 1 represents the cover, with my invention applied thereto.
Figure 2:
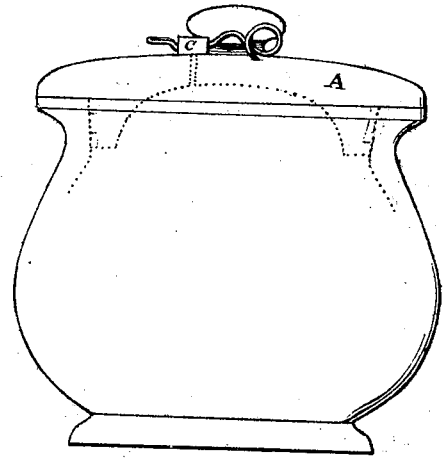
Figure 2 illustrates the vessel and cover united.

The construction and operation of my invention are as follows, to wit:

About the periphery of the flange $a$ of the cover A is cut an annular groove, in which is placed and fitted in such a manner as to be slightly protuberant, a ring of rubber, $b$, or other elastic and flexible material.

Through the top of the said cover is cut an aperture provided with the tightly-fitting spring valve C, which may be easily operated by the finger.

The inner circumference of the rim of the vessel is slightly beveled, in order that the cover may be fitted tightly by a slight downward pressure, and removed without friction.

When the aperture in the top of the cover is closed by the valve, it is held tightly in position by the pressure of the atmosphere, and noxious and disagreeable fumes are prevented from escaping.

When the valve is raised, however, the pressure of the atmosphere is equalized, and the cover may be removed with facility.

Having thus described the construction, operation, and relative arrangement of the component parts of my invention, I will indicate what I claim and desire to secure by Letters Patent in the following clause:

I claim a chamber-vessel provided with a beveled rim, in combination with the cover A, provided with a valve, C, and annular groove, in which is fitted a flexible ring, when constructed and operating as shown and specified.

In testimony that I claim the foregoing, I have hereunto set my hand this     day of     , 18

CHAS. H. BERRY.

Witnesses:
G. WHITMAN,
J. W. MESTER.